(12) United States Patent
Demuth et al.

(10) Patent No.: US 10,737,324 B2
(45) Date of Patent: Aug. 11, 2020

(54) SYSTEM AND METHOD FOR FORMING MATERIAL SUBSTRATE PRINTER

(71) Applicant: Lawrence Livermore National Security, LLC, Livermore, CA (US)

(72) Inventors: James A. Demuth, Mountain View, CA (US); Andrew Bayramian, Manteca, CA (US); Bassem S. El-Dasher, Livermore, CA (US); Kevin J. Kramer, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 775 days.

(21) Appl. No.: 14/504,646

(22) Filed: Oct. 2, 2014

(65) Prior Publication Data

US 2016/0096224 A1    Apr. 7, 2016

(51) Int. Cl.
| | |
|---|---|
| *B22F 3/105* | (2006.01) |
| *B33Y 10/00* | (2015.01) |
| *B33Y 70/00* | (2020.01) |
| *B22F 1/00* | (2006.01) |
| *B29C 64/153* | (2017.01) |
| *B29C 64/165* | (2017.01) |

(52) U.S. Cl.
CPC .......... *B22F 3/1055* (2013.01); *B22F 1/0074* (2013.01); *B29C 64/153* (2017.08); *B29C 64/165* (2017.08); *B33Y 10/00* (2014.12); *B33Y 70/00* (2014.12); *B22F 2003/1056* (2013.01); *Y02P 10/295* (2015.11)

(58) Field of Classification Search
CPC ............................... B33Y 10/00; B22F 3/1055
USPC ........................................................ 419/53
See application file for complete search history.

(56) References Cited

U.S. PATENT DOCUMENTS

| | | | |
|---|---|---|---|
| 6,416,624 B1 * | 7/2002 | Nielsen .................. | B05D 1/025 162/155 |
| 2014/0252687 A1 * | 9/2014 | El-Dasher ............. | B22F 3/1055 264/497 |

* cited by examiner

*Primary Examiner* — Weiping Zhu
(74) *Attorney, Agent, or Firm* — Harness, Dickey & Pierce, P.L.C.

(57) ABSTRACT

A method is disclosed for manufacturing a part via an additive manufacturing process. A solution is used which has a volatile component within which is suspended particles of a powdered material. The solution is heated until it at least one of begins boiling or is about to begin boiling. The heated solution is then deposited at least at one location on a substrate to help form a layer of the part. The volatile component then evaporates, leaving only the particles of powdered material. The particles are then heated to the melting point. The deposition and heating operations are repeated to successively form a plurality of layers for the part. The evaporation of the volatile component helps to cool the part.

18 Claims, 2 Drawing Sheets

SYSTEM AND METHOD FOR FORMING MATERIAL SUBSTRATE PRINTER

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to additive manufacturing systems and processes, and more particularly to an additive manufacturing system and method which delivers a powdered material suspended in a solution to a surface, after which the solution evaporates leaving just the powdered material, which is then melted by a heat source to form a material layer of a part.

BACKGROUND

The statements in this section merely provide background information related to the present disclosure and may not constitute prior art.

Current powder delivery systems for additive manufacturing ("AM") processes such as Selective Laser Sintering ("SLS"), Direct Metal Laser Sintering ("DMLS"), or Diode based Additive Manufacturing use a single type or composition of powder per part. The powder is swept over a lowered part creation zone creating a layer of powder of a specified thickness.

As layer upon layer of material is deposited in a traditional SLS or DMLS system, the part being created grows thicker and thicker. For the first few initial layers of part creation, the heat delivered to melt the material is removed by conduction to the base substrate that the powder is initially deposited on. As the part becomes thicker and thicker, this conduction pathway becomes insufficient at removing the excess heat in the part. As a result, the part begins to rise in temperature. The temperature of the part continues to increase as successive materials layers are melted, until the part eventually reaches a temperature which is just below the melting point of the powder. Accordingly, cooling the part to permit the continued application of material layers typically becomes a significant challenge. Complicating this is the desire to be able to fully complete the manufacture of the part, using the AM manufacturing process, in as short a time as possible.

Also, in traditional SLS or DMLS systems, the powder bed is filled with the powder to be melted, as well as a portion of the powder which is not melted. This can result in the powder bed being required to support significant weight when heavy and/or dense powdered material types are being used.

SUMMARY

In one aspect the present disclosure relates to a method for manufacturing a part via an additive manufacturing process. The method may comprise forming a solution including a volatile component within which is suspended a plurality of particles of a powdered material. The solution may be heated to a temperature at which the volatile component at least one of begins boiling or is about to begin boiling. A material deposition operation may then be performed by depositing the heated solution at least at one location on a substrate to help form a layer of the part, and allowing the volatile component to evaporate, thus leaving only the particles of powdered material at the location. A heating operation may then be performed using a heat source to heat the particles of powdered material to a temperature sufficient to melt and fuse the particles of powdered material together. The material deposition and heating operations may be repeated to successively form a plurality of layers for the part. The evaporation of the volatile component helps to cool the part.

In another aspect the present disclosure relates to a method for manufacturing a part via an additive manufacturing process. The method may comprise forming a first solution having a first volatile component within which is suspended a first plurality of particles of powdered material. A second solution may be formed which has a second volatile component within which is suspended a second plurality of particles of powdered material. The first and second solutions may be heated to temperatures at which the first and second volatile components at least one of begin boiling or are about to begin boiling. A material deposition operation may then be performed by depositing the heated first and second solutions at first and second different locations on a substrate to help form a layer of the part, and allowing the first and second volatile components to evaporate. This leaves only the first and second pluralities of particles of powdered material at the first and second different locations. A heating operation may then be performed using a heat source to at least substantially simultaneously heat the first and second pluralities of particles of powdered material to temperatures sufficient to melt and fuse the first plurality of particles of powdered material together, and to fuse the second plurality of particles of powdered material together. The material deposition and heating operations may be performed repeatedly to successively form a plurality of layers until the part is fully formed. The evaporation of the first and second volatile components helps to cool the part.

In still another aspect the present disclosure relates to a system for manufacturing a part via an additive manufacturing process. The system may comprise a solution including a volatile component within which is suspended a plurality of particles of a powdered material. A processor may be included which is used to control a heat source. The heat source is adapted to heat the solution to a temperature at which the volatile component at least one of begins boiling or is about to begin boiling. A material deposition component is included which may be controlled by the processor. The material deposition component may deposit the heated solution at least at one location on a substrate to help form a layer of the part, and wherein the volatile component may evaporate after being deposited to leave only the particles of powdered material at the location. The processor may control the heat source to heat the particles of powdered material to a temperature sufficient to melt and fuse the particles of powdered material together. The processor may cause additional depositing and heating operations to be repeatedly performed to successively form a plurality of layers for the part, and wherein the evaporation of the volatile component helps to cool the part during formation of the part.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
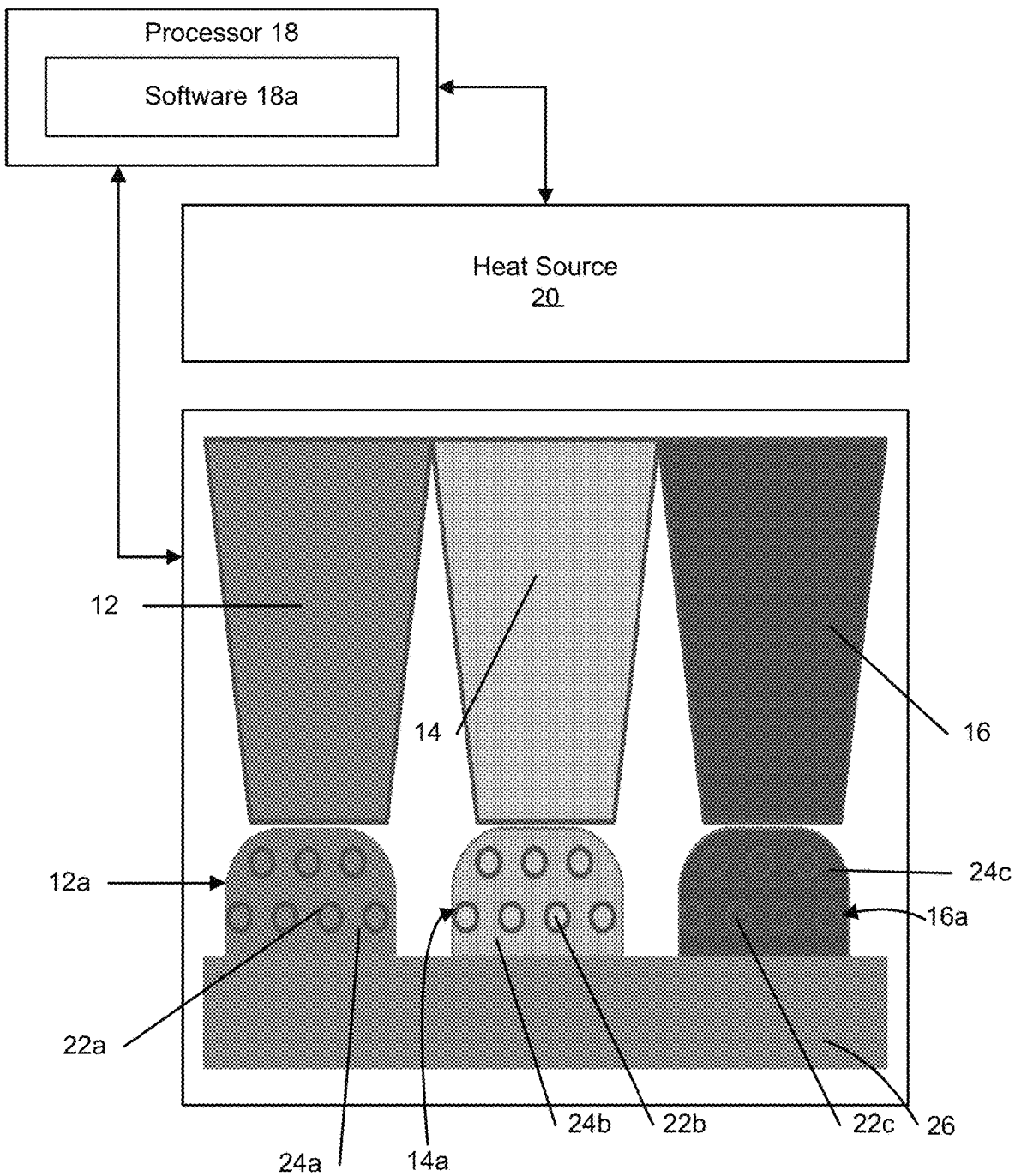
FIG. 1 is a high level illustration of a system in accordance with one embodiment of the present disclosure.

The following description is merely exemplary in nature and is not intended to limit the present disclosure, its application or uses. It should be understood that throughout the drawings, corresponding reference numerals indicate like or corresponding parts and features.

The system and method of the present disclosure makes use of a cooling mechanism in the form of a volatile solvent. The volatile solvent acts as a carrier fluid for material particles which are deposited on a substrate, or on a previously formed layer, during an additive manufacturing ("AM") process. The latent heat of vaporization of the fluid is capable of removing a great deal of heat and can effectively cool the surface of the part where it sees the thermal heat flux, and is the hottest.

Referring to FIG. 1, a system 10 in accordance with one embodiment of the present disclosure is illustrated. The system 10 may include one or more material deposition components, in this example nozzles 12-16, that are each able to deposit an associated solution 12a-16a which includes particles, for example metallic particles, that will be melted to form successive material layers one on top of another. In this example the solutions 12a-16a each include different types of particles 22a-22c, respectively. As a result, a part made using the system 10 may be formed from a plurality of different types of materials. This is in contrast to traditional types of AM systems which are only able to make a part using a single type of material.

While three nozzles 12-16 are illustrated, the system 10 is not limited to use with any particular number of different nozzles or material types. Thus, it is expected that the desired material qualities and/or the specific type of part being manufactured may dictate whether one, two, three or more different material types will be chosen/required for making a specific part.

Each of the nozzles 12-16 includes an associated reservoir (not shown) where a specific solution is contained that is deposited through its associated nozzle 12-16. Operation of the deposition of the solution from each nozzle 12-16 may be controlled by a processor 18 by opening and closing suitable valves associated with the nozzles 12-16. The processor 18 may also control a suitable heat source 20 for melting the particles of powdered material 22a-22c in each of the solutions 12a-16a after each is deposited on a substrate. The heat source 20 may comprise any device suitable for providing the required heat to melt the particles 22a-22c. For example, the heat source 20 may be formed by a laser or a laser diode light source. A high powered laser diode system that may be suitable for use in forming the system 10 is disclosed in co-pending U.S. patent application Ser. No. 13/785,484, filed Mar. 5, 2013 (U.S. Pub. No. 2014/0252687), and assigned to Lawrence Livermore Security LLC, the teachings of which are hereby incorporated by reference into the present disclosure.

The processor 18 may include suitable software 18a which includes information stored in a non-volatile memory, for example a lookup table stored in non-volatile random access memory, on specific temperatures and/or durations that need to be delivered to melt the particles of powdered material 22a-22c in each solution 12a-16a. As such, the delivery of optical power can be specifically "tuned" to the specific types of particles mixed into each of the solutions 12a-16a in order to melt the different types of particles within a determined time frame. The solutions 12a-16a in FIG. 1 may have the particles of powdered material 22a, 22b and 22c, respectively, suspended in volatile components 24a, 24b and 24c, respectively. The volatile components 24a-24c each act as a carrier fluid. The volatile components 24a-24c may comprise, for example, methanol, ethanol, acetone or any other suitable fluid capable of using latent heat of vaporization for cooling purposes.

Each solution 12a-12c is applied to a substrate 26 (or to a previously formed material layer) while the solution 24a-24c is at, or nearly at, its boiling point. As a result of the latent heat of vaporization, the volatile component 24a-24c of each solution 12a-12c then evaporates, leaving just the previously suspended particles of powdered material 22a-22b on the substrate 26 (or previously formed material layer) in the desired configuration. Importantly, the latent heat of evaporation effectively helps to cool the surface, that is either the substrate 26 or the surface of the previously formed layer(s), in the process.

Similar to how an inkjet printer delivers multi-colored ink, the system 10 is able to deliver multiple types of powdered materials. The powder layer remaining after the volatile component 24a-24c of each solution 12a-12c evaporates may be melted with the heat source 20 using a predetermined amount of energy selected for the specific type of powdered material. Thus, different types of particles of powdered material may have different amounts/levels of heat used to accomplish the melting of the particles thereof. The next layer of solution 12a-12c can then be deposited onto the surface of the just-formed layer and the material powder 22a-22b subsequently melted using the heat source 20. The evaporative cooling caused by the latent heat of vaporization of the volatile component 24a-24c of each solution 12a-12c keeps the surface of the previously formed material layer, and thus the part that is being produced, at a relatively constant temperature. This is an important benefit because it helps to maintain the entire part at an acceptable temperature as one layer after another of the part is built up using the system 10. As AM processes increase in speed in the years to come, the waste process heat might be such that the manufacturing process will need to periodically stop to give the part time to cool down. This technique would eliminate that need.

A particularly significant advantage of the system 10 is that it enables the manufacturing of parts containing many different materials to be fabricated in a single layer at once, or substantially at once. Thus, as an example, portions of a part that may require additional strength may be formed from one or more types of powdered material while other portions of the part requiring less strength can be formed using different types of powdered material. The ability to form a single part from a plurality of different powdered materials, and to be able to control where each powdered material is deposited, enables the physical properties of the produced part to be closely tailored to meet specific performance requirements (e.g., durability, longevity, thermal tolerance, stress tolerance, etc.) for the produced part.

The system 10 also enables potentially faster powder deposition over traditional "sweeping" methods typically employed in an AM process. In such traditional methods, typically one raster scan of material is laid down, with a plurality of scans (sometimes dozens or even hundreds) being required to form a single material layer. The system 10 enables multiple materials to be "printed" simultaneously, or virtually simultaneously, using the heat source 20 to form an entire layer of the part at one time or substantially at one time. The ability to cool the underlying surface on which the newest layer of solution 12a-12c has been applied, using the evaporative cooling which results from the latent heat of vaporization of the volatile components 24a-24c, allows cooling to be achieved at those locations on the part where the cooling is needed the most.

While a bed of powder may still be necessary for support, the bed can be made of materials that are of low cost while high cost materials can still be used in the layer that form portions of the actual part being produced. This eliminates the need to have a powder bed full of the material that is to be printed, especially if the printed part is small relative to the bed size, the material to be printed is expensive, or of high density. The nozzles 12a-12c can be rastered across the powder bed using the processor 18, printing (i.e., depositing) either only where material is desired, or printing material where desired to melt, and using a less expensive or lighter weight filler material everywhere else. In this regard it will be appreciated that by being able to use different types of powdered materials, the system 10 may potentially enable a part to be produced which is lighter than what would otherwise be the case with an AM formed part made from a single material.

Figure 2:
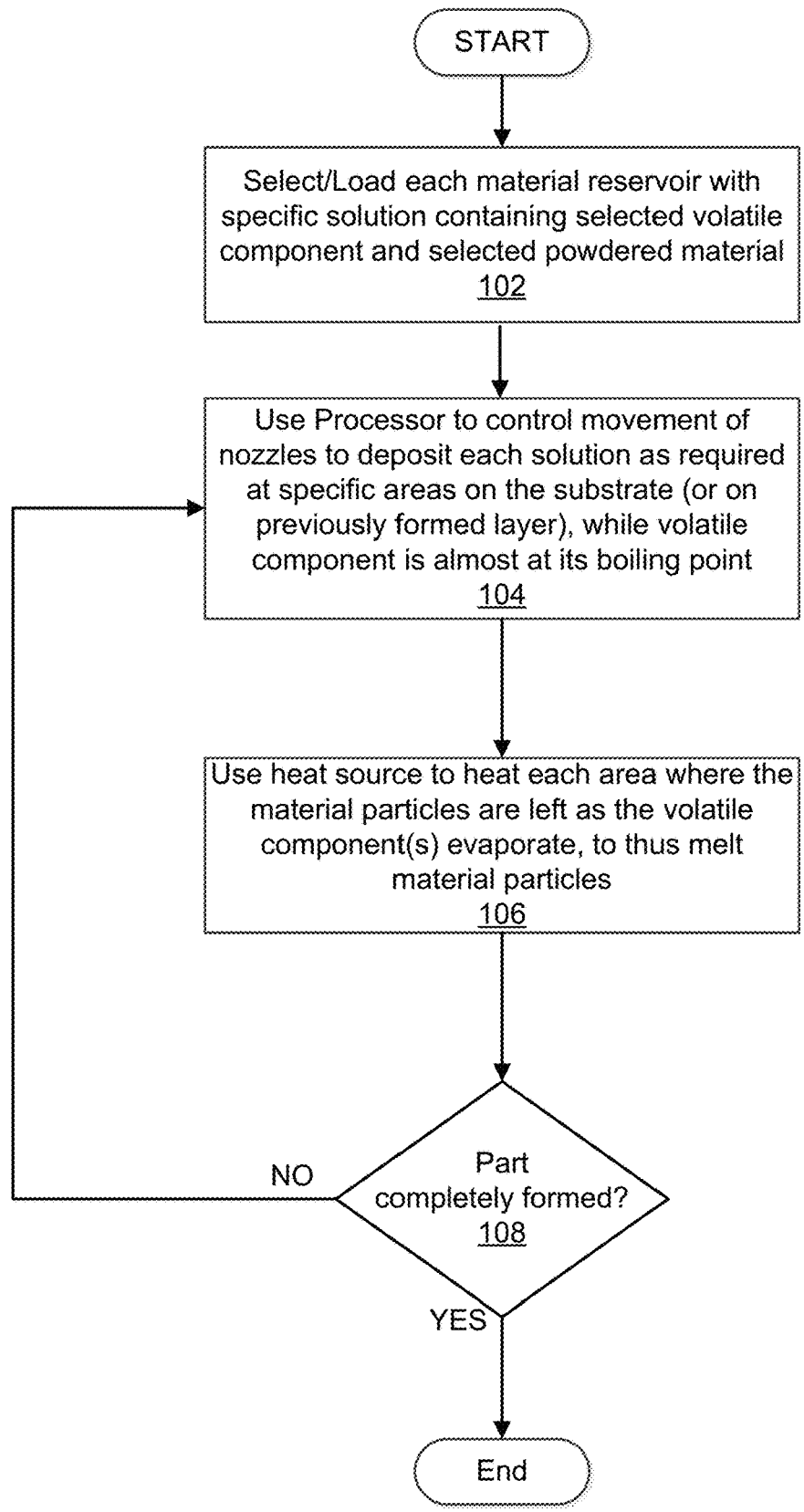
FIG. 2 is a flowchart illustrating one example of operations that may be performed by the system of FIG. 1 in carrying out an Additive Manufacturing ("AM") process to manufacture a part.

Referring to FIG. 2, a flowchart 100 is presented that provides one example of various operations that may be carried out in implementing the system 10 to make a specific part. At operation 102 the material reservoir(s) are each loaded with the different types of solutions that have been selected to make the part. For this example it will be assumed that a plurality of different solutions 12a-12c are being used, with each solution containing a different type of powdered material 22a-22c and a specific volatile component 24a-24c, which may be the same or which may differ from one another. At operation 104 the processor 18 may be used to control movement of the nozzles 12-16 to deposit the solutions 12a-16a at specific locations on the substrate 26 while the volatile components 24a-24c of each of the solutions 12a-16a are at or near their respective boiling points. The volatile component 24a-24c of each solution 12a-16a will evaporate very rapidly after the solutions 12a-16a are deposited on the substrate 26, typically within a few seconds or less, thus leaving only the powdered materials 22a-22c.

At operation 106 the heat source 20 may then be used to melt the powdered materials 22a-22c. The melting may be performed across the entire material layer substantially at once, rather than by raster scanning the heat source 20 back and forth over the substrate 26. This significantly expedites the formation of each layer of the part. As the melting of the powdered materials 22a-22c occurs, the particles of each type of material are fused together. Thus, any portions where powdered materials 22a remain will be fused into a solid section of the material layer, and the same will occur for powdered materials 22b and 22c.

At operation 108, a check is made by the processor 18 if the entire part has been completed, and if not, then operations 104-108 are re-performed as many times as needed to form the entire part, layer by layer. Once the check at operation 108 indicates that the part is completely formed, the AM process is then complete.

The system 10 and method thus allows for a plurality of powdered materials to be deposited, simultaneously, at each layer of a part to tailor the use of materials to the physical characteristics that are needed for the part. The latent heat of vaporization of the fluid also enables the part to be maintained at a reasonably consistent temperature during the AM process, which would otherwise be difficult or impossible to achieve with a conventional AM process.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for manufacturing a part via an additive manufacturing process, the method comprising:

forming a solution including a volatile component within which is suspended particles of a meltable metal powdered material able to form a structural part once fully melted and subsequently cooled, and wherein the volatile component enables deposition of the powdered material, the volatile component providing a cooling effect on a previously deposited material layer of a part being formed in a layer by layer process, and such that the cooling takes place intermittently with every application of a new quantity of powdered material about to be fused to form a new structural layer of the structural part;

performing a material deposition operation by depositing the solution, to at least one deposition location on a substrate to begin forming an initial layer of the structural part, and waiting a predetermined time period of at least about 1 millisecond to allow the volatile component to fully evaporate, thus leaving only the particles of powdered material at the one deposition location;

subsequent to expiration of the predetermined time period, performing a heating operation using an optical heat source to provide an optical beam to heat the particles of powdered material left from the deposited solution, to a temperature sufficient to melt and fuse the particles of a selected subportion of the powdered material together to form a single layer of the structural part, and a delivery of optical power from the optical beam being tuned to melt the particles of powdered material within a predetermined time frame, to form the selected sub-portion of a single layer of the structural part;

repeating the material deposition and heating operations to successively form a plurality of layers for the structural part, using the melted particles of powdered material to form each one of the plurality of layers for the part, and wherein each newly formed layer is fused to its previously formed said layer to form the structural part as single piece integrated structural part, and using the volatile component to keep a surface of each previously formed said layer of the part at a relatively constant temperature; and removing the finished structural part from the substrate.

2. The method of claim 1, wherein the volatile component in the solution comprises methanol.

3. The method of claim 1, wherein the volatile component in the solution comprises acetone.

4. The method of claim 1, wherein the volatile component in the solution comprises ethanol.

5. The method of claim 1, further comprising forming a plurality of different solutions that include different types of powdered material.

6. The method of claim 5, further comprising tailoring an amount of heat to be applied to each of the different types of powdered material to accomplish melting of the different types of powdered material.

7. The method of claim 5, further comprising forming the plurality of different solutions using a plurality of different volatile components.

8. The method of claim 1, wherein the solution is applied to a plurality of different areas on the substrate, and all of the particles of powdered material at the different areas on the substrate are heated at one time using the heat source.

9. A method for manufacturing a part via an additive manufacturing process, the method comprising:
    forming a first solution having a first volatile component within which is suspended a first plurality of particles of metal powdered material;
    forming a second solution having a second volatile component within which is suspended a second plurality of particles of powdered material;
    the first and second solutions each providing a cooling effect on a previously formed material layer of melted material;
    heating the first and second solutions to temperatures at which the first and second volatile components are at least about to begin boiling;
    performing a material deposition operation by depositing the heated first and second solutions, while the first and second solutions are at least about at their boiling points, at first and second different locations on a substrate to help form an initial layer of the part, and waiting a predetermined time period of at least about one millisecond to allow the first and second volatile components to evaporate, such that a latent heat of evaporation of the first and second solutions cools the substrate, thus leaving only the first and second pluralities of particles of powdered material at the first and second different locations;
    subsequent to expiration of the predetermined time period, performing a heating operation using an optical source which generates an optical beam, to at least substantially simultaneously heat the first and second pluralities of particles of powdered material to temperatures sufficient to selectively melt and fuse at least a selected subportion of the first plurality of particles of powdered material together, and to selectively melt and fuse at least a selected subportion of the second plurality of particles of powdered material together to form a single material layer of the part, a power of the optical beam being tuned to achieve selective melting of the selected subportions of the first and second pluralities of particles within a predetermined time frame;
    repeating the material deposition and heating operations to cool each previously formed material layer before beginning a new heating operation on a newly deposited material layer, to successively form a plurality of layers until the part is fully formed as a finished part, and wherein each one of the plurality of layers is formed by the melted and fused selected subportions of the first and second pluralities of powdered material, and using the volatile components to keep a surface of each previously formed said layer of the part at a relatively constant temperature; and
    removing the finished part from the substrate;
    wherein the evaporation of the first and second volatile components helps to repeatedly, intermittently cool the part in between each heating operation while the particles of powdered material are being melted and fused to a previously formed material layer, as the part is being formed layer-by-layer into the finished part.

10. The method of claim 9, further comprising tailoring the heating operation such that a different amount of heat is applied to each of the first and second pluralities of particles of powdered material to achieve a required melting.

11. The method of claim 9, wherein at least one of the first and second volatile components comprises ethanol.

12. The method of claim 9, wherein at least one of the first and second volatile components comprises acetone.

13. The method of claim 9, wherein at least one of the first and second volatile components comprises methanol.

14. The method of claim 9, wherein different levels of heat are used to heat the first and second pluralities of particles of powdered material.

15. The method of claim 9, further comprising using a third plurality of particles of powdered material which forms a filler material for the part.

16. A method for manufacturing a part via an additive manufacturing process, the method comprising:
    forming a solution including a volatile component within which is suspended particles of a metal meltable powdered material, and wherein the volatile component enables deposition of the powdered material;
    performing a material deposition operation by depositing the solution, to at least one deposition location on a substrate to begin forming an initial layer of the part;
    performing a heating operation using an optical heat source to provide an optical beam to heat the deposited solution containing the powdered material to at least the solution boiling point, to help form an initial layer of the part, and waiting a predetermined time period of at least about one millisecond to allow the volatile component to evaporate, such that a latent heat of evaporation of the solution cools the substrate, thus leaving only the particles of powdered material;
    continuing the heating operation using an optical heat source to provide an optical beam to heat the particles of powdered material, to a temperature sufficient to melt and fuse the particles of a selected subportion of the powdered material and a portion of the substrate to form a first layer of the part, and a delivery of optical power from the optical beam being tuned to melt the particles of powdered material, to form the selected sub-portion of a single layer of the part;
    repeating the material deposition and heating operations to successively form a plurality of layers for the part, using the melted particles of powdered material to form each one of the plurality of layers for the part, and wherein each newly formed layer is fused to its previously formed said layer to form the part as a single piece integrated part.

17. The method of claim 16, wherein the part is removed from the substrate after the manufacturing process is complete such that the substrate is not part of the final part.

18. A method for manufacturing a part via an additive manufacturing process, the method comprising:

forming a solution including a volatile component within which is suspended particles of a metal meltable powdered material able to form a structural part once fully melted and subsequently cooled, and wherein the volatile component enables deposition of the powdered material, the volatile component providing a cooling effect on a previously deposited material layer of a part being formed in a layer by layer process, and such that the cooling takes place intermittently with every application of a new quantity of powdered material about to be fused to form a new structural layer of the structural part;

performing a material deposition operation by depositing the solution, to at least one deposition location on a substrate to begin forming an initial layer of the structural part, and waiting a predetermined time period of at least about 1 millisecond to allow the volatile component to fully evaporate, thus leaving only the particles of powdered material at the one deposition location;

subsequent to expiration of the predetermined time period, performing a heating operation using an optical heat source to provide an optical beam to heat the particles of powdered material left from the deposited solution, to a temperature sufficient to melt and fuse the particles of a selected subportion of the powdered material together to form a single layer of the structural part, and a delivery of optical power from the optical beam being tuned to melt the particles of powdered material within a predetermined time frame, to form the selected sub-portion of a single layer of the structural part;

repeating the material deposition and heating operations to successively form a plurality of layers for the structural part, using the melted particles of metal meltable powdered material to form each one of the plurality of layers for the part, and wherein each newly formed layer is fused to its previously formed said layer to form the structural part as single piece integrated structural part, and using the volatile component to keep a surface of each previously formed said layer of the structural part at a relatively constant temperature; and removing the structural part as a finished structural part from the substrate such that the substrate is not part of the final structural part.

\* \* \* \* \*